Dec. 24, 1935.   G. E. REPASS   2,025,672
BUILDER FOR SPINNING FRAMES
Filed Nov. 25, 1933   11 Sheets-Sheet 1

Inventor
George E. Repass
By Cyrus Kehr
his Attorney

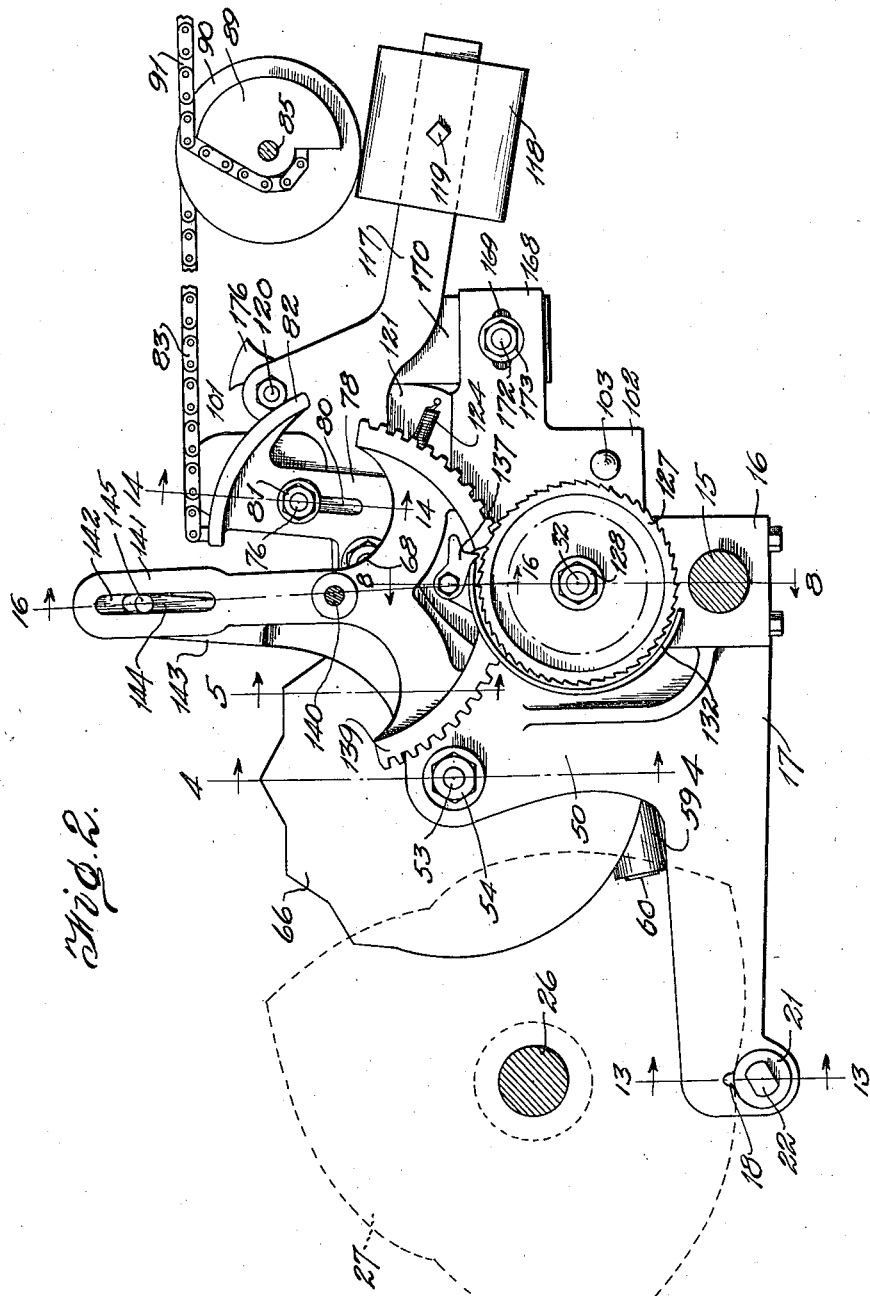

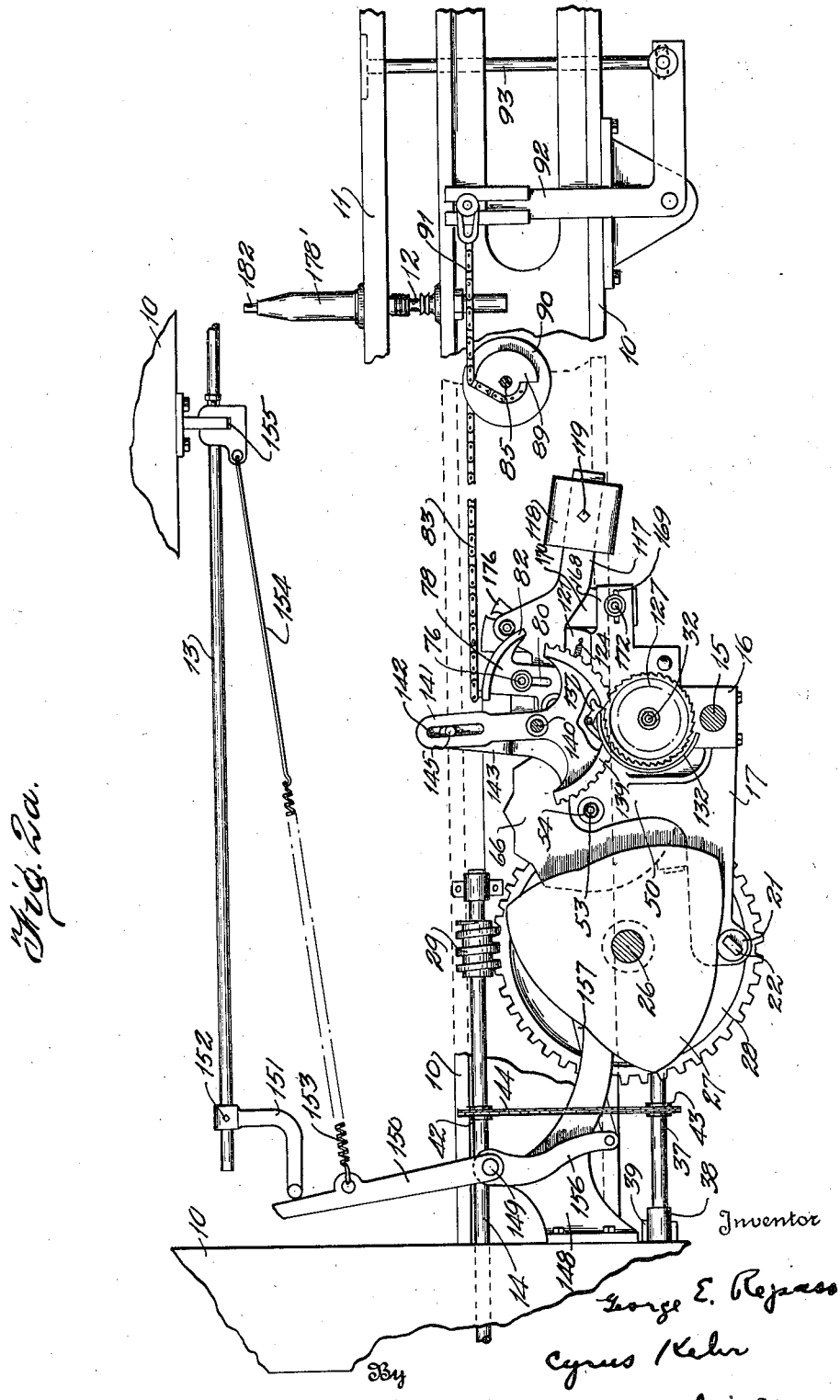

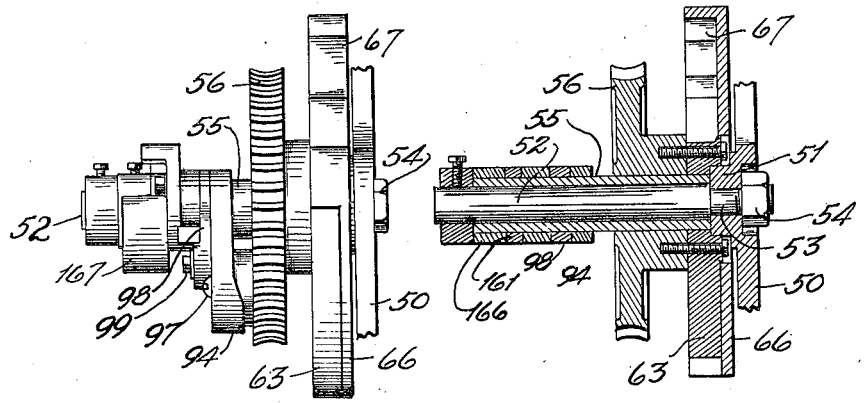
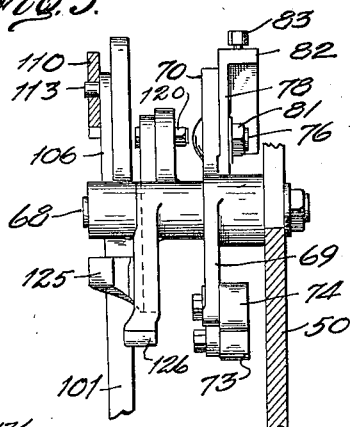
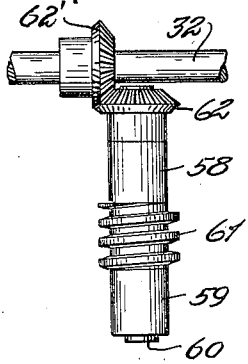
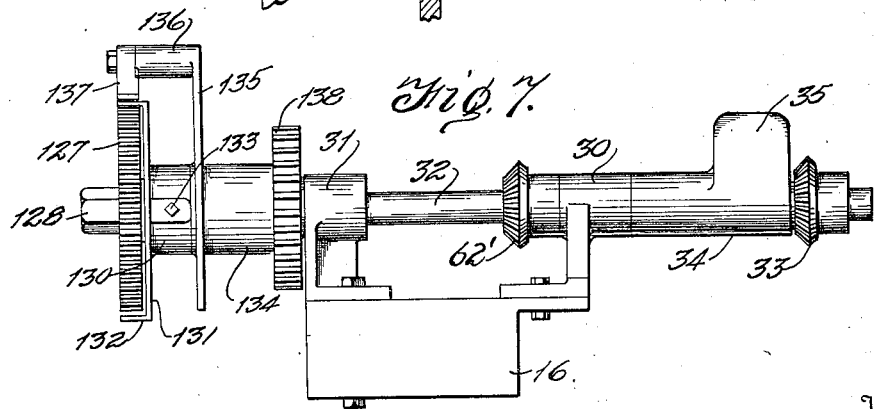

Dec. 24, 1935.    G. E. REPASS    2,025,672
BUILDER FOR SPINNING FRAMES
Filed Nov. 25, 1933    11 Sheets-Sheet 5
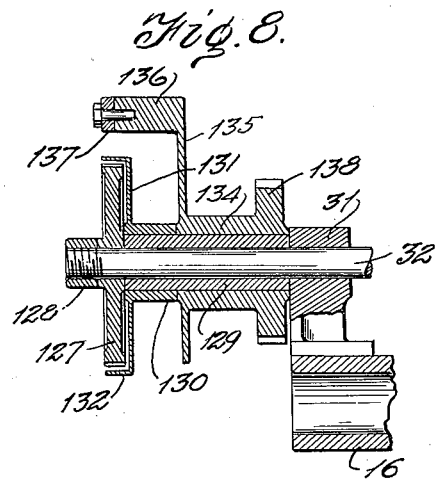
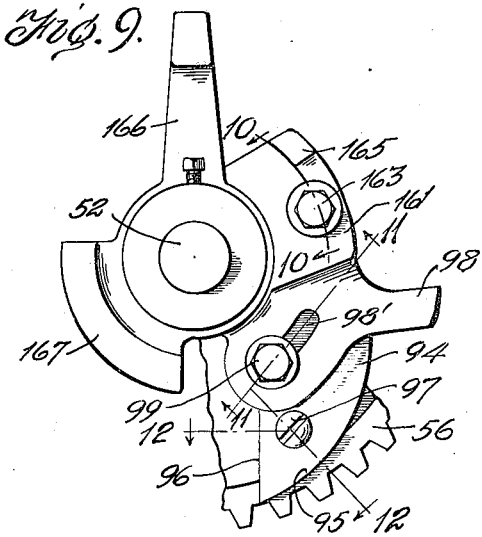
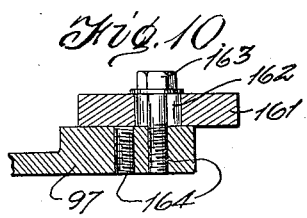
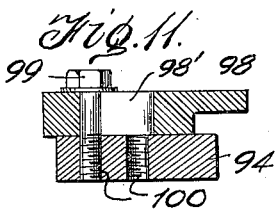
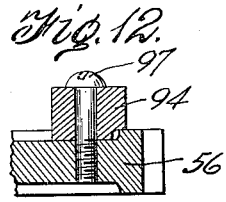
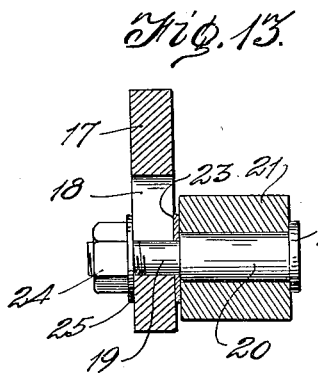
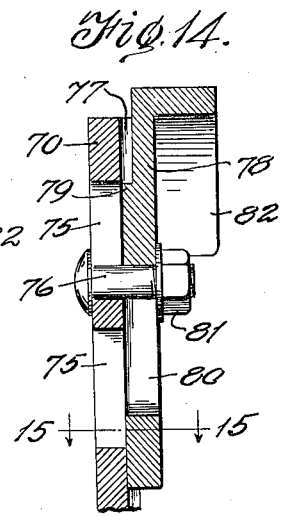
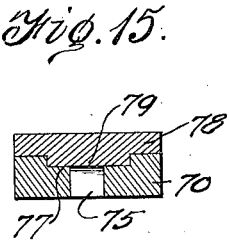
Inventor
George E. Repass
By Cyrus Kehr
his Attorney Dec. 24, 1935.                G. E. REPASS                2,025,672
                        BUILDER FOR SPINNING FRAMES
                    Filed Nov. 25, 1933         11 Sheets-Sheet 6
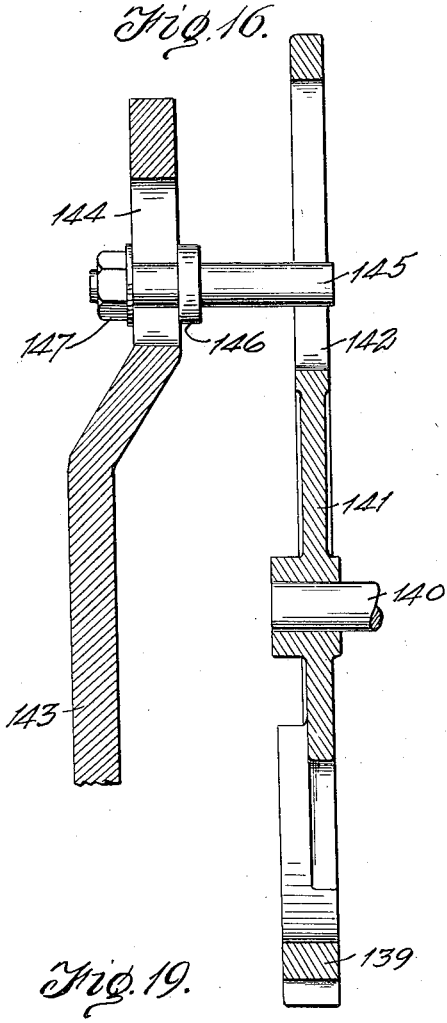
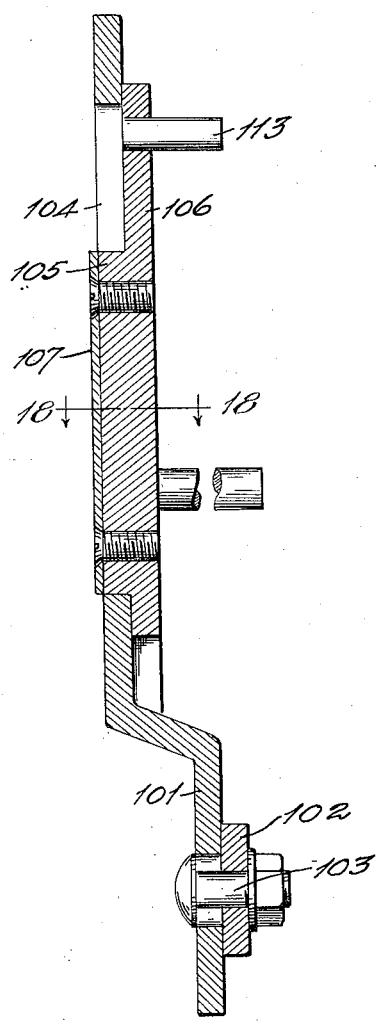
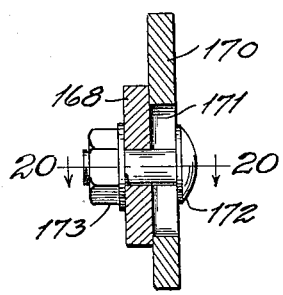
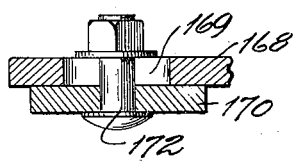
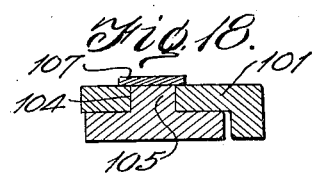
Inventor
George E. Repass
By Cyrus Kehr
his Attorney Dec. 24, 1935.  G. E. REPASS  2,025,672
BUILDER FOR SPINNING FRAMES
Filed Nov. 25, 1933   11 Sheets-Sheet 7

Inventor
George E. Repass
By Cyrus Kehr
his Attorney

Dec. 24, 1935.  G. E. REPASS  2,025,672
BUILDER FOR SPINNING FRAMES
Filed Nov. 25, 1933    11 Sheets-Sheet 8

Inventor
George E. Repass
By Cyrus Kehr
his Attorney

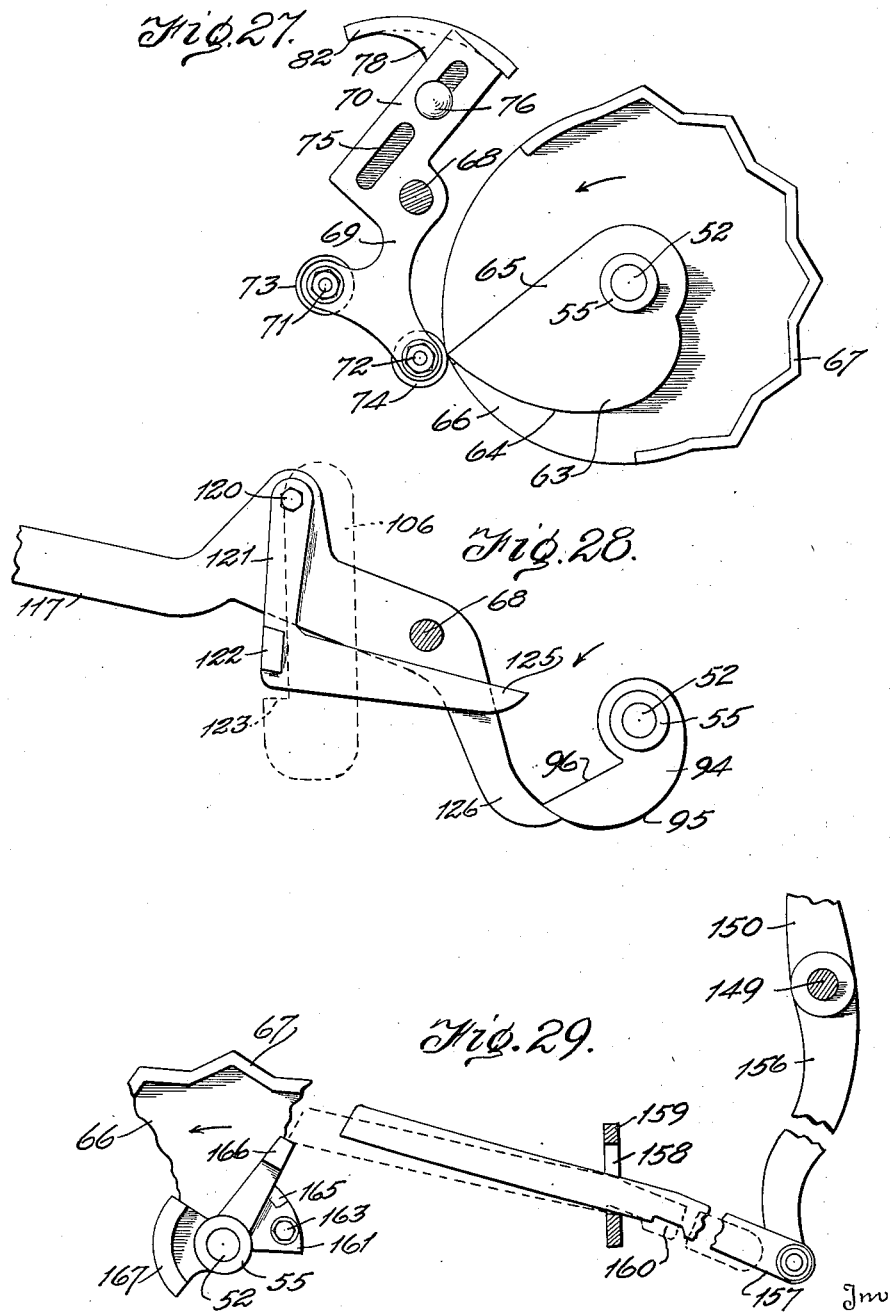

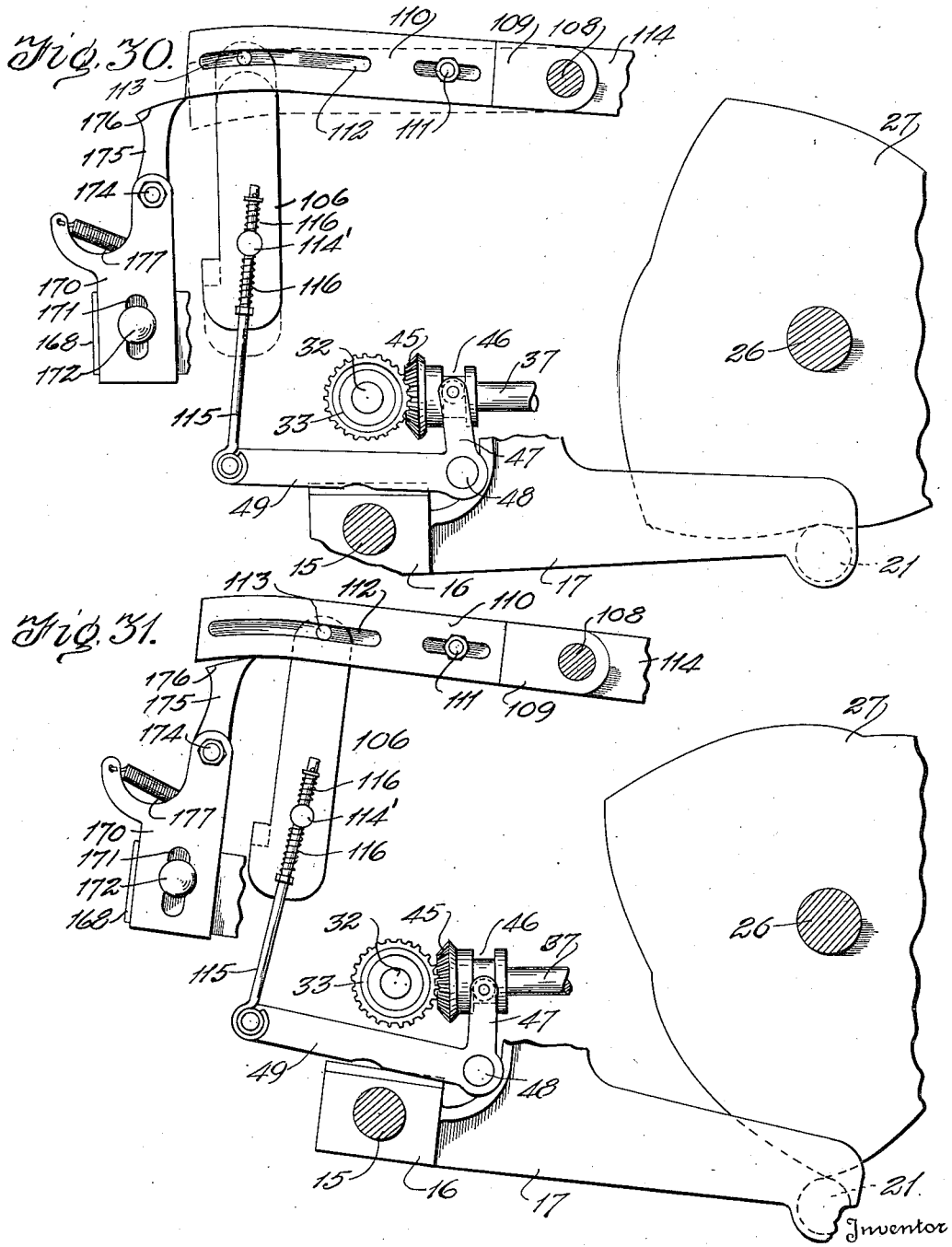

Dec. 24, 1935.    G. E. REPASS    2,025,672
BUILDER FOR SPINNING FRAMES
Filed Nov. 25, 1933    11 Sheets-Sheet 11
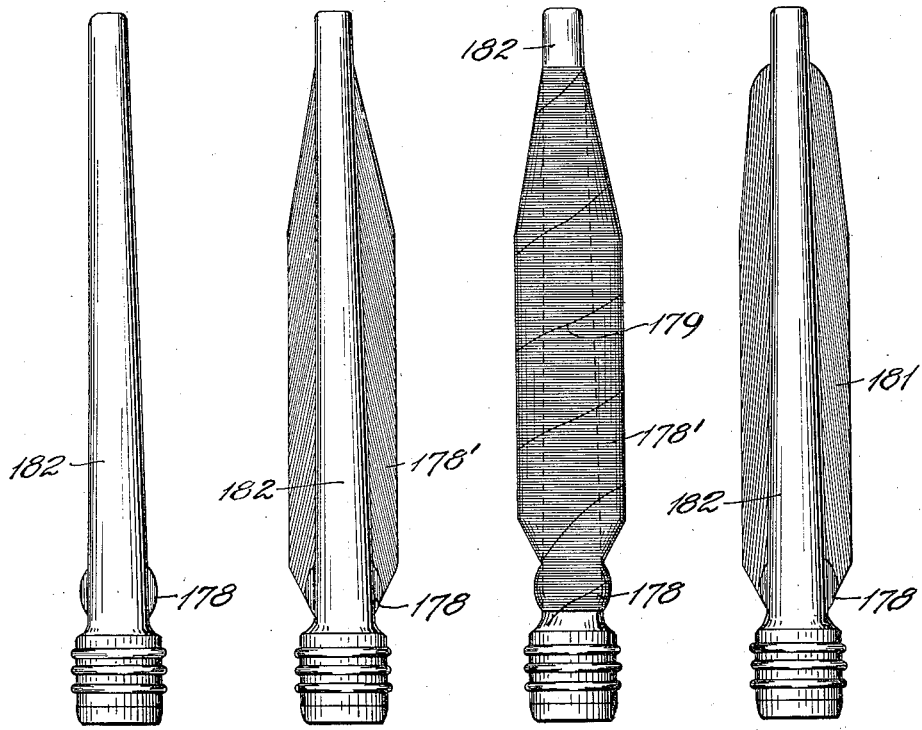
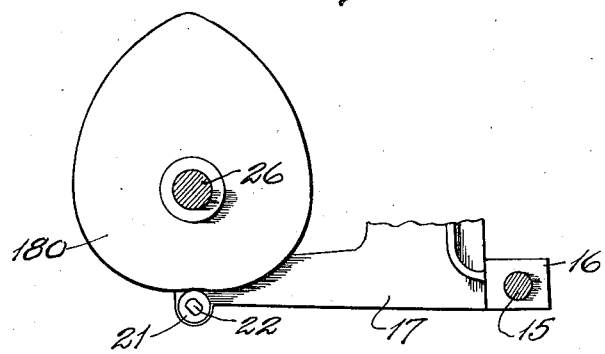

Patented Dec. 24, 1935

2,025,672

UNITED STATES PATENT OFFICE 2,025,672

BUILDER FOR SPINNING FRAMES

George E. Repass, Knoxville, Tenn.

Application November 25, 1933, Serial No. 699,779

29 Claims. (Cl. 118—5)

This invention relates to spinning, and has special reference to a builder for spinning frames.

It is common in this art to wind yarn on cops or bobbins carried by rapidly revolving vertical spindles, the yarn being properly guided along the bobbins by spinning rings carried by a ring rail which is given vertical reciprocation as the spindles are revolved. In machines for this purpose the ring rail is commonly given a reciprocatory motion much less than the desired length of the bobbin to be filled, but means are provided to cause the successive reciprocations of the ring-rail to advance upwardly of the bobbin so that the winding is in the form of overlapping frusto-conical layers. This is done by a pick motion which includes an oscillating pawl working on a ratchet.

After the bobbins have been filled to the desired points in their lengths, as determined by the operator from observation, it is common to disengage certain of the gears used in effecting reciprocation of the ring-rail so that the latter is allowed to drop to its lowest position. Then, by means of a suitable crank, the pick motion is wound back to its original starting position and the frame is ready for doffing. Obviously, the rotation of the spindles is stopped simultaneously with the release of the ring frame to allow it to drop.

As thus commonly operated, the length of the bobbins filled depends entirely on the attention given by the operator and his accuracy of eye in estimating the extent of bobbins filled. Knockoff or stop motion devices have been proposed to effect stoppage of the machine and dropping of the ring-rail when the bobbins were sufficiently filled. These devices have not been satisfactory since, among other objections, it was still necessary to rewind the picker motion. Also, attempts have been made to effect such rewinding by reversing gearing, but such devices have been found too complicated and uncertain in operation and are not now used in spinning mill operation as practiced in cotton mills.

It is the principal object of the present invention to provide a novel spinning frame builder whereby all the operations incident to winding a set of bobbins, from the beginning of winding to its end and stopping the frame with the ring-rail at the bottom of the bobbins in doffing position, is effected automatically, the only manual operations necessary for winding a set of bobbins being those of placing empty bobbins on the spindles, starting the machine, and doffing the filled bobbins.

Another important object of the invention is to provide novel means, in such a spinning frame builder, whereby a bunch winding is formed at the lower end of each bobbin and thereafter regular layers are wound on the remainder of the bobbin, the means being such that it may be adjusted to start the regular layers at any desired part of the bunch winding.

A third important object of the invention is to provide a novel spinning frame builder having means acting upon completion of the bobbin filling part of its operation to restore the mechanism to its initial starting position and to stop the machine with the mechanism in such initial position.

A fourth important object of the invention is to provide a spinning frame builder having novel means whereby to regulate the length of bobbin filled.

A fifth important object of the invention is to provide a novel means for controlling the length of that part of the winding which, when completed, is of cylindrical form.

A sixth important object of the invention is a mechanism to cause the ring rail to traverse so as to form a bobbin containing as many yards as possible when filled, and then automatically cause the ring rail to come back to the starting place and stop the frame with the ring rail at the bottom of the bobbin so the doffer will not have anything to do but take off the full bobbins, then put on the empty bobbins, push on the shipper to start the frame in operation for another set of bobbins.

A seventh important object of the invention is to have a builder which will not let the ring rail wind the yarn too close to the top end of the bobbin; this is to prevent the frame from running over or making tangled bobbins.

With the above and other objects in view, as will be presently apparent, the invention consists in general of certain novel details of construction and combinations of parts hereinafter fully described, illustrated in the accompanying drawings, and specifically claimed.

In the accompanying drawings, like characters of reference indicate like parts in the several views, and:—

Fig. 2 is a side elevation thereof showing the side opposite that shown in Fig. 1, certain parts being omitted;

Fig. 2a is a side elevation from the same side as Fig. 2, but showing the device on a reduced scale in its relation to certain parts of a spinning frame;

Fig. 3 is a front elevation of a certain cam group forming part of the builder;

Fig. 4 is a detail section on the line 4—4 of Figs. 1 and 2 and showing the cams of Fig. 3;

Fig. 5 is a detail view from the same direction as Fig. 3 but showing certain levers or rockers actuated by the cams of Fig. 3;

Fig. 6 is a detail plan view looking downwardly from the line 6—6 of Fig. 1 and showing parts of the drive for the cam group of Fig. 3;

Fig. 7 is a view from the right of Fig. 2 but showing only the lower part of the builder and disclosing part of the pick motion;

Fig. 8 is a detail section on the line 8—8 of Fig. 2, showing part of the pick motion;

Fig. 9 is an enlarged detail elevation of part of the cam group shown in Fig. 3 but taken from the same side as Fig. 1;

Fig. 10 is a section on the line 10—10 of Fig. 9;

Fig. 11 is a section on the line 11—11 of Fig. 9;

Fig. 12 is a section on the line 12—12 of Fig. 9;

Fig. 13 is an enlarged detail section on the line 13—13 of Fig. 2;

Fig. 14 is an enlarged detail section on the line 14—14 of Fig. 2;

Fig. 15 is a section on the line 15—15 of Fig. 14;

Fig. 16 is an enlarged detail section on the line 16—16 of Fig. 2;

Fig. 17 is an enlarged detail section on the line 17—17 of Fig. 1;

Fig. 18 is a section on the line 18—18 of Fig. 17;

Fig. 19 is an enlarged detail section on the line 19—19 of Fig. 1;

Fig. 20 is a section on the line 20—20 of Fig. 19;

Fig. 27 is a view similar to Fig. 21, but with the parts shown in position as the winding of the bobbin is about completed;

Fig. 28 is a view similar to Fig. 22, but with the parts shown in position to correspond with Fig. 27;

Fig. 29 is a schematic view of certain parts of the stop motion including a camming-arm forming part of the cam group shown in Fig. 3, the parts being shown in position effecting stopping of the spinning frame;

Fig. 30 is a detail side elevation of those elements of the mechanism which insure the disengagement of the bunch forming gears during winding of the body of the cop, the parts being shown in the positions they assume with the ring rail lowered;

Fig. 31 is a view similar to Fig. 30, but showing the parts in the positions assumed when the ring rail is raised;

Fig. 32 is a view of one of the bobbins of a spinning frame showing a bunch formed thereon in section;

Fig. 33 is a view similar to Fig. 32, but showing the bobbin completely filled;

Fig. 34 is a side elevation of a filled bobbin with the body winding starting at the upper end of the bunch;

Fig. 35 is a view of a bobbin wound for warp use and showing the winding in section;

Fig. 36 is a detail view showing a modified form of main or oscillating cam for use in producing warp wound bobbins.

Figure 1:
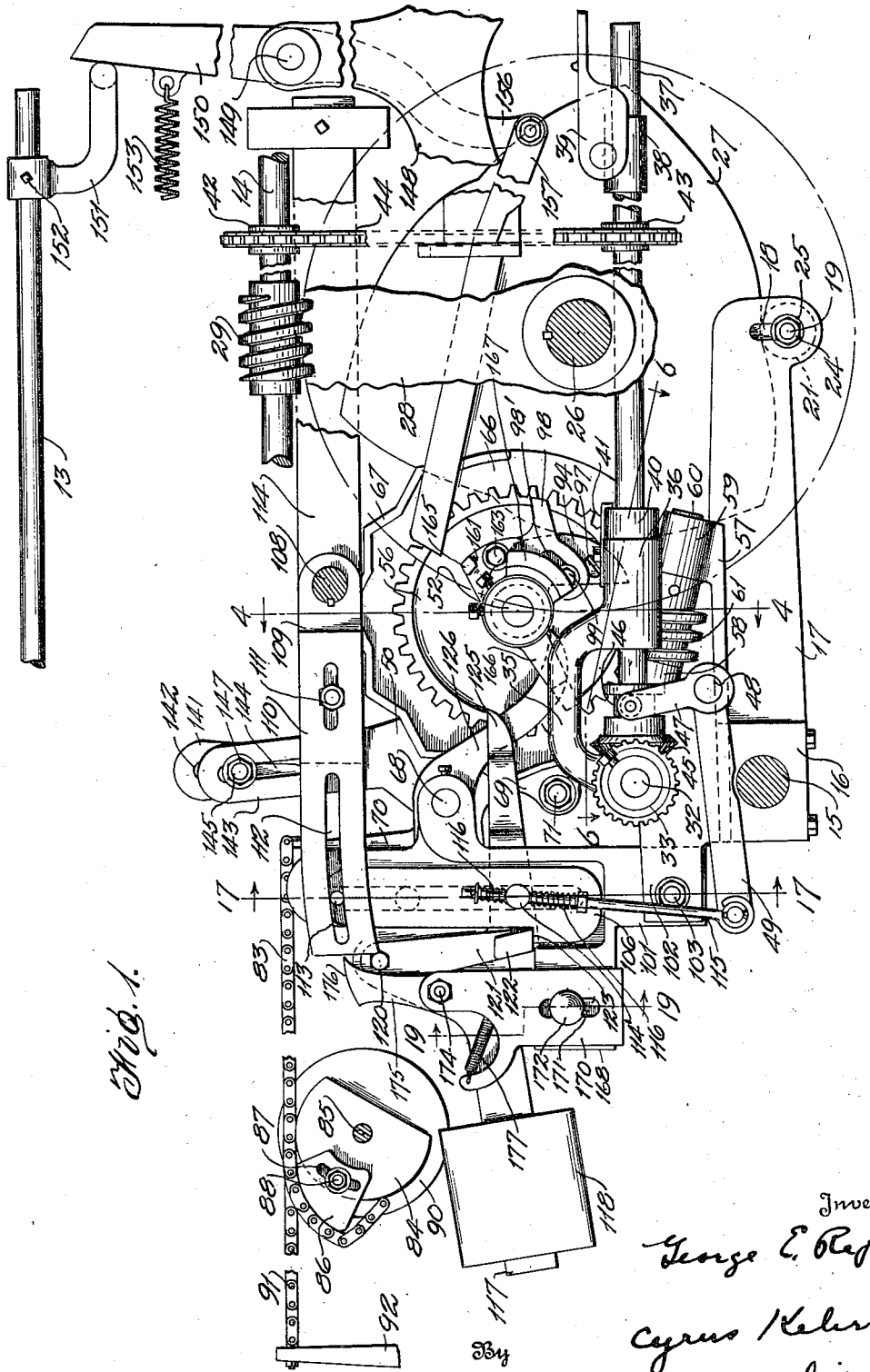
Fig. 1 is a side elevation of the improved spinning frame builder.

In the embodiment of the invention as here disclosed there are shown in Fig. 2a portions 10 of the frame of a typical spinning frame or machine. Also in this figure there is shown part 11 of the ring-rail; one of the spindles 12, a part 13 of the shifter rod which controls the starting and stopping of the spinning frame and one end of the builder drive-shaft 14 common to such spinning machines. Furthermore, there is shown in this and other figures a stub-shaft or stud 15 rigidly supported from the frame 10 and on which the whole builder mechanism rocks.

Mounted on the shaft 15 is a base block 16 from which projects an arm 17 having a vertical slot 18 at its outer end. Through this slot (Fig. 13) extends the shank 19 of a stub-shaft 20 on which a roller 21 is held by means of a head 22 formed on the shaft. A washer 23 is positioned against the shoulder formed between the shaft and its shank and a nut 24 bears against a similar washer 25 on the opposite side of the arm 17 so that the shaft is clamped in any desired position in the slot 18. Suitably journaled on the frame 10 is a shaft 26 whereon is fixed a cam 27 which, for the purposes of filling filler or weft bobbins, preferably has three high and three low points. This cam engages the roller 21 and the rotation of this cam oscillates the block 16 on the shaft 15 as shown in Figs. 30 and 31. Fixed on the shaft 26 is also a worm-wheel 28, shown broken away in Fig. 1 and a worm 29 fixed on the shaft 14 meshes with the worm wheel 28 so that, during the operation of the spinning frame, the cam 27 is constantly rotated and thus the block 16 is constantly oscillated during such operation.

Mounted on the base block 16 are bearings 30 and 31 (Fig. 7) wherein is journalled a cross-shaft 32. On the front end of the shaft 32 is fixed a bevel gear 33, and between this gear and the bearing 30 an oscillatable bearing 34 is mounted on the shaft 32. An arm or yoke 35 projects from the bearing 34 and carries a bearing 36, the axis of which intersects the axis of the shaft 32 at right-angles thereto. A shaft 37 is journalled adjacent one end in the bearing 36, and the other end of the shaft 37 is slidably and rotatably mounted in a bearing 38 transversely pivoted to a bearing plate or support 39 fixed to the frame 10. The shaft 37 is provided adjacent the bearing 36 with a collar 40, and the bearing 36 has a clip 41 secured thereto and engaging the collar 40 to prevent longitudinal movement of the shaft relative to the bearing 36. On the shaft 14 is fixed a sprocket-wheel 42 which is connected to a similar wheel 43 fixed on the shaft 37 by a chain 44. On the shaft 37 is splined a bevel gear 45 which is slidable on the shaft into and out of mesh with the gear 33. This gear 45 is provided with a hub having a groove 46 for reception of the pins of a shifter fork 47 mounted on a rock-shaft 48 suitably supported on the block 16. A rock-arm 49 is fixed to the fork 47, and oscillation of the rock-arm 49 engages and disengages the gears 33 and 45.

Extending up from the arm 17 is a builder frame plate 50 from which a boss 51 (Fig. 4) projects in a forward direction. Projecting forwardly from the boss 51 is a cam supporting shaft 52 which has a reduced end 53 projecting rearwardly through the boss and having a nut 54 screwed thereon so that the shaft is rigidly secured to the frame plate 50. Revolubly mounted on the shaft 52 is a cam-sleeve 55 on which is fixed a worm-wheel 56 arranged in spaced relation to the frame plate 50. Extending from the block 16 is a bracket 57 provided with spaced bearings 58 and 59, wherein is mounted a shaft 60, the axis of which intersects the axis of the shaft 32 at right-angles thereto. A worm 61 is fixed on the shaft 60 between the bearings and on the end of the shaft 60 adjacent the shaft 32 there is fixed a bevel gear 62 (see Fig. 6) which meshes with a similar bevel gear 62' fixed on the shaft 32. The worm 61 meshes with the worm-wheel 56, and thus rotation of the shaft 32 effects rotation of the wheel 56 and sleeve 55.

Figure 21:
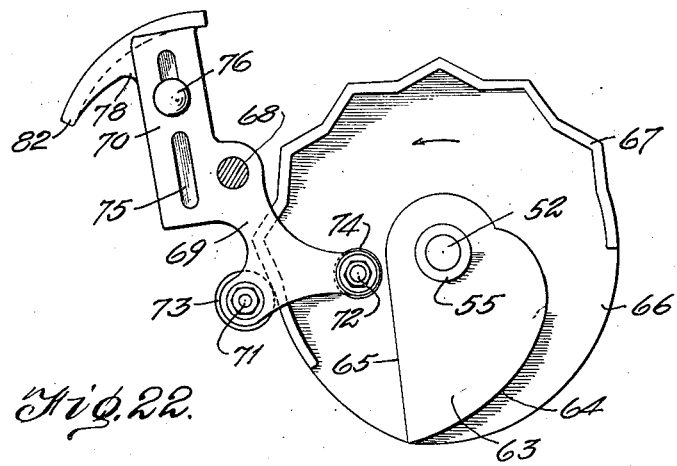
Fig. 21 is a detail schematic elevation of the bunch forming and pick motion cams and the rocker actuated thereby, the parts being in initial position.

Fixed to the worm wheel 56 is a cam 63 having a peripheral cam edge 64 and a drop edge 65. This cam carries a disk 66 with a sinuous flange 67 projecting from this disk over the cam 63 and in spaced relation thereto, as shown in Figs. 4 and 21. The flange 67 extends slightly more than half way around the periphery of the disk 66 and lies about opposite the high point of the cam 63. Projecting forward from and rigidly attached to the frame plate 50 is a shaft 68 whereon is mounted a double armed lever having a downwardly extending arm 69 and an upwardly extending arm 70 (see Fig. 21). The arm 69 lies in slightly spaced relation in front of the plane of the edge of the flange 67 and has its lower end laterally widened to support stub-shafts 71 and 72. On the stub-shaft 71 is mounted a cam roller 73 which coacts with the exterior face of the sinuous flange 67 while the stub-shaft 72 carries a cam-roller 74 for coaction with the cam 63. The arm 70 (Fig. 14) is provided with longitudinal slots 75 through either of which may be selectively positioned a bolt 76, these slots opening at the rear into a longitudinal groove or channel 77.

A plate 78 is provided with a longitudinal rib 79 which fits slidably in this channel and this plate 78 is also provided with a slot 80 through which the bolt 76 passes, so that a nut 81 may be screwed on the bolt and thus secure the plate 78 in adjusted relation to the arm 70. By reason of this the arm 70 may be considered an extensibly adjustable arm and the bolt and nut form means to secure it in extensibly adjusted position. The upper end of the plate is provided with an arcuate flange 82 forming a rocker segment, and to the end of this segment nearer the cam 67 is anchored one end of a chain 83 which has its other end anchored to a drum segment 84 carried on a shaft 85 suitably supported from the frame 10. Adjustably secured to the segment 84 is a block 86 over which the chain is trained, the adjustment of the block being effected by an arcuate slot 87 and a bolt 88 passing through the slot into the segment. A second drum segment 89 is preferably formed integrally with the segment 84, a flange 90 being interposed between the two. A chain 91 has one end anchored to this second segment 89 and extends around part of the segment and to one arm of a bell-crank lever 92 pivotally supported from the frame 10. The other arm of this lever 92 extends along the frame 10 and has its free end pivoted to a liftrod 93 which engages beneath the center of the ring rail 11 so that, as the lever 92 is oscillated, the ring rail is alternately raised and lowered.

Figure 24:
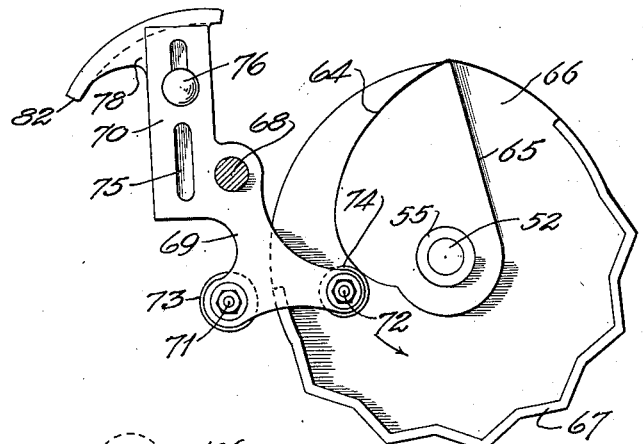
Fig. 24 is a view similar to Fig. 21 but showing the parts at the finish of the formation of the bunch winding.
Figure 25:
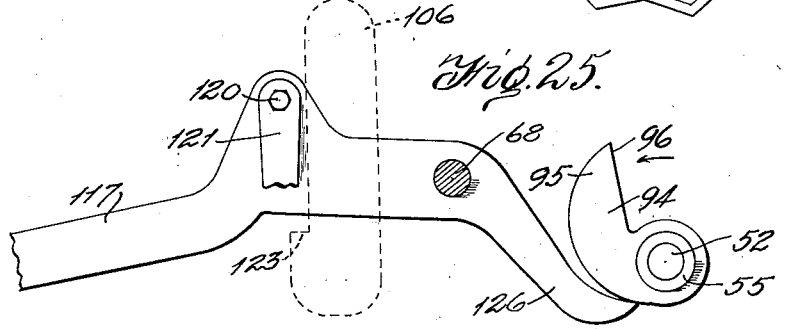
Fig. 25 is a view similar to Fig. 22 but with the parts positioned in correspondence to Fig. 24.

In order to understand the operation of the cams 67 and 64, reference is had especially to Figs. 21, 24 and 27 wherein the direction of rotation of the cams is shown by the arrows. Fig. 21 indicates the position of the parts at the beginning of winding the bobbins. At this time the cam roller 73 rests against a low part of the cam 67 and the ring rail 11 is in its lowermost position. As the cams rotate, the roller 73 is caused to oscillate from and towards the axis of rotation until the cam 63 engages the roller 74, whereupon, as shown in Fig. 24, the roller 73 is moved clear of the cam 67. From this time on, until the cams have assumed the position shown in Fig. 27, the roller 74 will be continuously moved away from the axis of rotation of the cams. Further movement of the cams causes the roller 74 to ride inwardly toward this axis along the flat part or drop 65 of the cam 63 until the roller 73 again engages the cam 67 in the position shown in Fig. 21. Under the influence of the cam 67, the segment 82 therefore makes a series of short oscillations and, since the high points and low points are grouped on arcs concentric to the axis of rotation, these oscillations will be of equal amplitude and cover limits controlled by the cam 67. Consequently, the ring rail 11 will be given a series of short vertical reciprocations of equal amplitude and between fixed limits, and the bunch winding shown in Fig. 32 will be formed. By reason of the arrangement of the drum segments 84 and 89 and the adjustment of block 86, the position of the bunch winding and its extent may be varied. As the cam 63 comes into effective operation, the segment 82 is rocked until it reaches the extreme position of Fig. 27, and because of this the ring rail 11 is lifted to its extreme upper position. Obviously, the longer the adjustable upper arm 70, the greater will be the lift of the ring-rail so that, by adjusting this extensible arm, the height to which the bobbins are filled is controlled.

Figure 22:
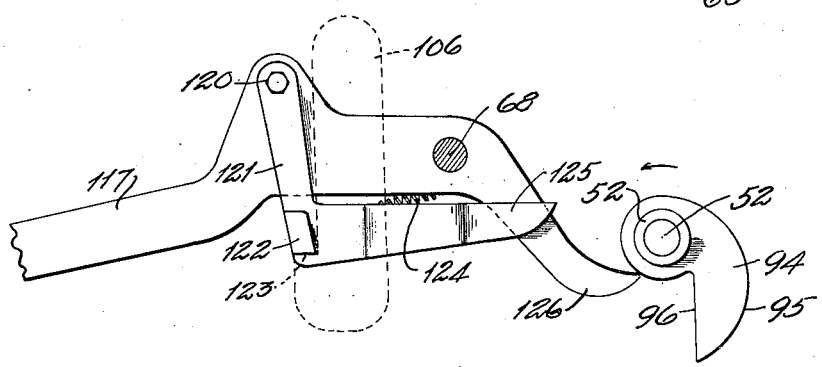
Fig. 22 is a similar view, in corresponding position to Fig. 21, of the gear re-engaging cam and the weight lever actuated thereby.

Mounted on the sleeve 55 is a single throw cam 94 which has an eccentric cam edge 95 (see Fig. 22) and an abrupt drop formed by a flat edge 96. This cam, which is termed the resetting cam for convenience in referring thereto, is fixed to the wheel 56 by a screw 97. The function and operation of this cam will be presently considered.

Figure 23:
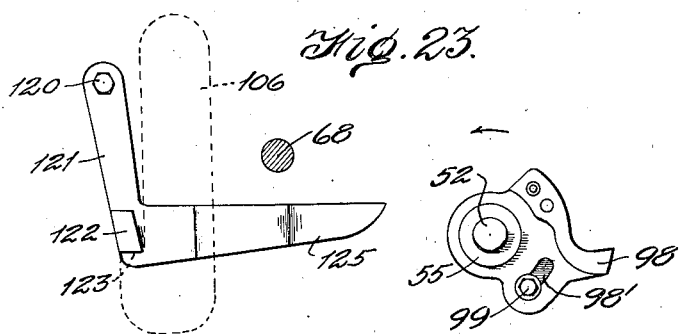
Fig. 23 is a similar view, in corresponding position to Fig. 21, of the gear releasing cam and the lever actuated thereby.

Mounted on the sleeve 55 is a cam or trip-arm 98 (see Figs. 9 and 23) which has a slot 98' therein concentric with the shaft 52 and through this slot passes a bolt 99 which is screwed into one or the other of a plurality of threaded openings 100 in the cam 94. By means of this bolt and slot arrangement, the trip arm 98 may be adjusted about the shaft 52 to desired relation with the cam 67 for purposes presently explained. Mounted on the shaft 68 is a guide bracket 101 which has its lower end fixed to a bracket 102 supported by the block 16, a bolt 103 serving to hold the two brackets together. The guide bracket 101 (see Fig. 17) is provided in its upper part with a slot 104 wherein fits a rib 105 formed on a slide 106, which is held to the bracket for vertical sliding movement thereon by a coverplate 107 secured over the rib 105.

A rock-shaft 108 (Figs. 1 and 30) is suitably supported from the frame 10 and has keyed thereto a rock-arm consisting of longitudinally adjustable sections 109 and 110 held in adjusted relation by a bolt and slot connection 111. The section 110 is provided with an arcuate slot 112 normally substantially concentric with the axis of the shaft 15, and a pin 113 projects from the upper end of the slide 106 into this slot. A weighted arm 114 is fixed on the rock-shaft 108 and projects in the opposite direction from the rock-arm 109, 110 so that the slide 106 is constantly urged in an upward direction. Projecting from the lower part of the slide 106 is a pin 114', and a link 115 passes through this pin and slides therein. This link has its lower end connected to the free end of the rock-arm 49. Springs 116 interposed between abutments on the link 115 and the pin 114' serve to hold this link yieldably in normal position in the pin 114'. Journaled on the shaft 68 is an arm 117 (Figs. 1, 2 and 22) carrying a heavy weight 118 slidable along the arm and held in adjusted position by a set-screw 119. Projecting from an upwardly extending part of the arm 117 (Fig. 22) is a pivot-bolt 120, on which is pivoted an arm 121 which swings down from the pivot 120 and is provided with a nose 122 which engages on a stop shoulder 123 formed on the slide 106. The weighted arms 114 and 117 and weights are so proportioned that normally the slide 106 is held down by the action of the arm 121. A spring 124 (Fig. 2) urges the nose 122 into contact with the slide. The lower end 125 of the arm 121 projects into the path of the trip-arm 98. Also an arm 126 projects from the arm 117 into the path of the cam 94.

Figure 26:
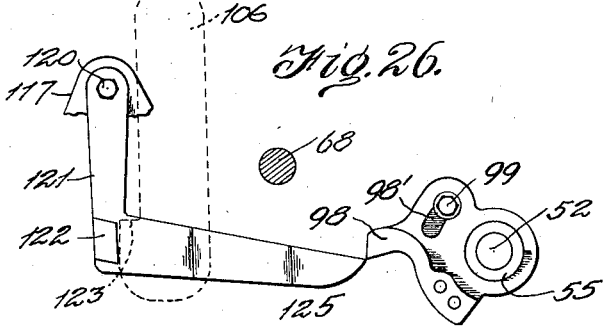
Fig. 26 is a view similar to Fig. 23 but with the parts positioned in correspondence to Fig. 24.

The action of the cam 94 and trip-arm 98 in their relation to the cams 67 and 63 will now be explained, special reference being had to Figs. 21 to 28 inclusive. At the start of operations, the trip arm 98 is free from the end 125 of arm 121 and the cam 94 is free from the arm 126. As the oscillations due to the action of the cam 67 previously described are completed (Fig. 24) the trip-arm 98 engages the end 125 and moves it as indicated in Fig. 26, so that the nose 122 is released from the shoulder 123, thus permitting the slide 106 to rise. This rocks the rock-arm 49 and shifter fork 47 and disengages the gear 45 from the gear 33. Up to this time the action has been rapid owing to the fact that the shaft 32 has been driven directly from the rapidly revolving shaft 37, but now the slow pick motion, presently to be described, becomes effective and the cams 63 and 94 become effective. During the movement from the positions shown in Figs. 24 and 25 to those shown in Figs. 27 and 28 and cam 63 slowly rocks the segment 82 to its extreme position, and the cam 94 engages and depresses the arm 126 so that the arm 117 and arm 121 are raised until the nose 122 is clear of the shoulder 123, whereupon the arm 121 swings to bring the nose 122 directly above the shoulder. The roller 74 now engages the outer end of the surface 65 and simultaneously the cam 94 disengages the arm 126. Then under the influence of the weight 118, the arm 117 and arm 121 drop and the nose 122 engages the shoulder 123 and carries the slide 106 down since the effect exerted by the lever 117 is greater than the effect exerted by the lever 114. The dropping of the slide effects re-engagement of the gear 45 with the gear 33 (Fig. 31) and the cams 63 and 67 (Fig. 21) revolve rapidly to starting position.

The slow or pick motion above referred to is best illustrated in Figs. 2, 7 and 8, and it will be there seen that a ratchet-wheel 127 is fixed on the rear end of the shaft 32, a nut 128 serving to hold the ratchet-wheel 127 securely in position. A sleeve 129 extends rearwardly from the bearing 31 and the shaft 32 passes through this sleeve and is revoluble therein. On the sleeve 129 adjacent the ratchet-wheel is mounted a hub 130 carrying a disc 131 which is provided around a portion of its periphery with a flange 132 extending over the ratchet-wheel and housing in portion of its teeth. The hub 130 is secured in adjusted relation on the sleeve 129 by a set screw 133. An outer sleeve 134 is oscillatably mounted on the sleeve 129 between the bearing 31 and the hub 130 and on the rear end of the outer sleeve is a plate 135 carrying a rearwardly projecting arm 136 to which is pivoted a pawl 137 adapted, when moved in one direction, to engage the teeth of the ratchet-wheel 127 and rotate the latter, and, when moved in the opposite direction to ride freely over the teeth. This pawl oscillates through a predetermined arc, and, by proper adjustment of the hub 130, is caused to ride to a desired extent in its oscillation on the flange 132. When riding on the flange it is, of course, ineffective to operate the ratchet-wheel and thus its effective arc of oscillation is controlled. Since rotation of the shaft 32 effects rotation of the cam 63 which controls the upward feeding of the ring rail in building the body winding on the bobbin, the rate at which the ring-rail is thus intermittently fed upward may be controlled in accordance with the material to be wound and the manner in which it is desired to build the winding on the bobbin. On the other end of the sleeve 134 is a gear 138 wherewith meshes a gear segment 139 (Figs. 2 and 16) oscillatable on a shaft 140 fixed to a suitable part of the frame. This segment is provided with an upwardly extending arm 141 having a slot 142 extending longitudinally thereof. The frame plate 50 has an upward extension 143 (Fig. 16) having a vertical slot 144 therein. An operating pin 145 projects through the slots 142 and 144 and is provided with a collar 146 which bears against the rear face of extension 143 so that the pin may be adjusted in the slot 144 and held in adjusted position by a nut 147 screwed on the front end of the pin. Since the cam 27 effects rocking of the plate 50 on the shaft 15 and the shaft 140 is fixed, this rocking causes oscillation of the segment 139 and thus oscillation of the pawl 137 and consequent step-by-step slow rotation of the shaft 32.

A suitable mechanism is provided to stop all operations after the bobbins have been wound and the ring rail returned to its normal position, and, to this end, there is fixed to the frame 10 a bracket 148 (Fig. 2a) whereon is mounted a rock-shaft 149 carrying a lever 150 engaging an arm 151 slidably mounted on the shifter rod 13 of the spinning frame and held in adjusted position by a set-screw 152. As shown, the shifter rod 13 is moved to the left of Fig. 2a to start the spinning frame and to the right to throw the driving belt from the fast to the loose pulley common in such machines and thus to effect stopping of the spinning frame. A tension spring 153 urges the lever 150 and thus the shifter rod 13 to the stop position, the spring being attached by a rod 154 to a bracket 155 fixed to the frame 10. The rock shaft 149 carries a downwardly extending rock-arm 156 to which is pivoted one end of a latch-bar 157, which passes through a slot 158 (Fig. 29) formed in a flange 159 extending at right-angles from the bracket 148. A notch 160 is provided on the under edge of the latch bar 157 so that when the arm 156 is moved to starting position the notch engages the flange 159 at the bottom of the slot and latches the arm 156 in running position.

On the sleeve 55 (Figs. 4, 9 and 10) is mounted a trip actuating arm 161 which is provided with an arcuate slot 162, wherethrough passes a bolt 163 which is screwed into one or the other of a pair of threaded openings 164 formed in the trip arm 98. By this means the trip actuating arm may be adjusted in its relation to the trip arm 98 and thus to the several cams concentric therewith. The arm 161 carries a forwardly projecting lug 165. Mounted revolubly on the sleeve 55 is a stop motion trip-arm 166 having a counterweight 167 by which the arm 166 is held normally at the start of the winding in the position shown in Fig. 1, but, as the cams revolve, the lug 165 engages the arm 166 and carries it around with it until the arm 166 engages (Fig. 29) the latch arm 157 and raises it to release the notch from its engagement with the flange 159, and thus permits movement of the lever 150 and effects movement of the shifter rod to position to stop actuation of the spinning frame. Obviously, by proper adjustment of the arm 161 this stopping is effected at the time when the ring rail is at its lowest position after operation of the cams on the sleeve 55.

Mechanism is provided to insure that the gear 45 will remain disengaged during the operation of the pick motion and also to insure that the slide 106 will drop to re-engage the gears only at that instant in the rocking movement of the plate 50 on the shaft 15 when the roller 21 is at a low spot on the cam 27 and the ring rail is thus at the lower end of one of its reciprocations. This mechanism may be seen in Figs. 1, 30 and 31, certain details being shown in Figs. 19 and 20. The guide bracket 101 has an extension 168 projecting from the left side of the bracket in Fig. 1. This extension is provided with a horizontal slot 169. A pawl bracket 170 provided with a vertical slot 171 is positioned against the forward face of the extension and a bolt 172 passes through the two slots and is provided with a nut 173. By this arrangement the pawl bracket 170 may be adjusted both horizontally and vertically and held in adjusted position. The upper end of the pawl bracket is forked and on one of the arms of the fork there is provided a pivot bolt 174. A pawl 175 is pivoted intermediate its ends on bolt 174 and one arm of the pawl extends upwardly and terminates in an arcuate nose 176 which, so long as the slide 106 is down, engages against the end of the arm section 119. When, however, this arm section and the slide rise, the lower edge of the arm section clears the nose 176 so that the pawl may slide beneath the same (Figs. 30 and 31). The other end of the pawl is connected by a tension spring 177 to the remaining arm of the forked upper end of the pawl bracket 170. Because of this arrangement the pawl will yield to permit rocking of the plate 50 on the shaft 15 by the cam 27, so long as the slide 106 is down, but, when the slide 106 has lifted, the rocking of the plate 50 will cause the pawl nose 176 to oscillate between the position shown in Fig. 30 and that shown in Fig. 31. Thus only when the pawl nose is in the position shown in Fig. 30 can the slide 106 drop and since this position is assumed only when the roller 21 is at a low point in the cam 27 the gear 45 re-engages with the gear 33 only when the ring rail is at the lower end of a reciprocation.

Since the details of operation have already been described, it is only necessary here to give a general summary of the various winding operations. In thus describing the operation, it will be assumed that the spinning frame has been filled with a set of empty bobbins and the machine is at rest. The operator starts the spinning frame by moving the rod 13 to the left of Fig. 2a against the action of the spring 153. The latch-bar 157 drops and latches the spring under tension. The shaft 14 now revolves and drives the cam 27 which effects continuous rocking motion of the whole plate 50 on the shaft 15. Also the shaft 14 effects rapid drive of the shaft 37 and thus of the shaft 32 through the engaged gears 45 and 33. This causes the cam 67 to revolve at a relatively rapid rate and, since the cams 27 and 67 are timed for this purpose, causes short reciprocations of the ring rail at the lower part of its vertical movement and builds the bunch 178 (Figs. 32 to 35). If the trip arm 98 is set in one extreme position of adjustment, it will operate to release the nose 122 from the shoulder 123 when the ring rail is at the lower point of such reciprocation, the effect of which is shown in Fig. 33. If, on the contrary, the trip-arm 98 is set at the other extremity of its adjustment, the nose 122 will be released with the ring rail at the highest point in its bunch building reciprocations and the effect shown in Fig. 34 will be produced. Obvious intermediate settings will produce intermediate starting-points for winding the body of the cop. In any case, as soon as the nose 122 is released the gear 45 is disengaged from the gear 33 and the pick motion begins to operate. This pick motion has been hitherto inoperative since the ratchet wheel 127 has been rotated more rapidly than the feed motion of the pawl 137 and the wheel thus runs freely beneath the pawl. At this instant the short reciprocations of the ring rail due to the combined actions of the cams 27 and 67 cease and the cam 27 alone acts to reciprocate the ring rail through the rocking motion of the builder. At the same time the cam 63 operates to move the flange 82 and thus gradually feeds the ring rail upwardly while it continuously reciprocates. This effects building of the body 178' of the cop, the direction of the wound layers of which is indicated by the direction of the cross-hatching or section lines in Fig. 33. Dependent on the throw of the cam 27 these layers will be of greater or less individual vertical extent and thus the conical upper end of the cop can have its angle of conicity controlled as desired by changing the cam 27 to one of a different throw. During the winding of the body, the arm 121 is gradually raised by the action of the cam 94. This cam may be set in the direction of or against the direction of the arrow in Fig. 28. When set forward (in the direction of the arrow) the weighed arm 117 will be allowed to drop sooner than when the cam is set backward. Because of this, when the cam is set forward the slide 106 will be moved down sooner than with the cam set backward. Thus the time at which this slide 106 moves downwardly may be regulated.

Upon the movement of the slide downwardly the gear 45 is reengaged with the gear 33, the pick motion ceases effective operation, and the cam 66 rotates rapidly to allow the ring rail to drop. This produces a rapid downward winding of the thread as shown at 179 in Fig. 34. As the ringrail reaches its lowest position, the arm 157 is raised to unlatch the lever 150 so that the spring 153 is free to act and move the shifter rod to stop position, thus completing the operation. It will be seen that the setting of the cam 94 thus controls the height to which the bobbin is filled since motion of the ring rail by the pick motion ceases as the slide 106 moves downwardly and a rapid completion of the effect of cam 63 which regulates the total height of winding will take place so that but little thread is wound on the upper end of the bobbin after the slide 106 moves downwardly.

If it be desired to wind the bobbins for warp thread, a single throw cam 180 (Fig. 36) may replace the cam 27 and the layers of the body winding 181 will be as shown by the cross hatching in Fig. 35. The bobbins 182 are of usual standard type, no special form of bobbin being necessary for use in connection with this builder.

What is claimed, is:—

1. A spinning frame builder having a ring rail reciprocating chain and including a builder supporting shaft, builder frame elements mounted on said shaft and oscillatable thereon, a driving shaft, main cam means driven from said driving shaft and effecting oscillation of the builder on the supporting shaft, a segment supported on one of the builder frame elements for oscillation relative thereto and having one end of the chain attached thereto, means effecting primary relatively short oscillations of the segment and thereafter effecting a single long oscillation of said segment, a stop motion device for causing stoppage of operation of the spinning frame, and a release mechanism for said stop motion device operating in timed relation to the completion of the long oscillation of the segment.

2. In a builder mechanism for spinning machines, a supporting frame, a draft chain segment mounted on said frame for oscillatory motion, a driving shaft, a driven shaft, gears on said shafts, one of which is movable to mesh with and unmesh from the other, means associated with the driven shaft to impart slow motion thereto, means actuated from the driven shaft and effecting oscillation of the chain segment, and gear controlling means for unmeshing and remeshing said gears in timed relation to the last-mentioned means.

3. In a builder mechanism for spinning machines, a supporting frame, a draft chain segment mounted on said frame for oscillatory motion, a driving shaft, a driven shaft, gears on said shafts, one of which is movable to mesh with and unmesh from the other, means associated with the driven shaft to impart slow motion thereto, means actuated from the driven shaft and effecting a series of short oscillations of the chain segment followed by a single long oscillation thereof, and gear controlling means acting to unmesh the gears upon completion of the series of short oscillations and to remesh the gears in timed relation to the completion of the long oscillation.

4. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, and gear controlling means holding said gears in mesh during action of the sinuous cam and unmeshing the gears upon completion of action by the sinuous cam.

5. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, and including adjustable timing mechanism and means to hold the timing mechanism in adjusted positions.

6. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting oscillation of the chain segment, gear controlling means for unmeshing and remeshing said gears in timed relation to the last-mentioned means, and a stop motion device controlling the driving shaft, and means operating in timed relation to the gear controlling means for effecting operation of the stop motion device.

7. In a builder mechanism for spinning machines, a supporting frame, a draft chain segment mounted on said frame for oscillatory motion, a driving shaft, a driven shaft, gears on said shafts one of which is movable to mesh with and unmesh from the other, a pick motion associated with the driven shaft to impart slow motion thereto, means actuated from the driven shaft and effecting a series of short oscillations of the chain segment followed by a single long oscillation thereof, gear controlling means acting to unmesh the gears upon completion of the series of short oscillations and to remesh the gears in timed relation to the completion of the long oscillation, and a stop motion device controlling the driving shaft, and means operating in timed relation to the gear controlling means for effecting operation of the stop motion device.

8. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, and a stop motion device controlling the driving-shaft, and means operating in timed relation to the gear controlling means for effecting operation of the stop motion device.

9. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, including adjustable timing mechanism and means to hold the timing mechanism in adjusted positions, a stop motion device controlling the driving shaft, and means operating in timed relation to the gear controlling means for effecting operation of the stop motion device.

10. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting oscillation of the chain segment, gear controlling means for unmeshing and remeshing said gears in timed relation to the last-mentioned means, means for supporting the builder for oscillation about a fixed axis, a cam arm projecting from the builder, a rotatable main cam acting on said arm to oscillate the builder, and latch means for releasably holding the gear controlling means against remeshing the gears and acting to release the gear controlling means in timed relation to the rotation of said main cam.

11. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting a series of short oscillations of the chain segment followed by a single long oscillation thereof, gear controlling means acting to unmesh the gears upon completion of the series of short oscillations and to remesh the gears in timed relation to the completion of the long oscillation, means for supporting the builder for oscillation about a fixed axis, a cam arm projecting from the builder, a rotatable main cam acting on said arm to oscillate the builder, and latch means for releasably holding the gear controlling means against remeshing the gears and acting to release the gear controlling means in timed relation to the rotation of said main cam.

12. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, means for supporting the builder for oscillation about a fixed axis, a cam arm projecting from the builder, a rotatable main cam acting on said arm to oscillate the builder, and latch means for releasably holding the gear controlling means against remeshing the gears and acting to release the gear controlling means in timed relation to the rotation of said main cam.

13. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, including adjustable timing mechanism, means to hold the timing mechanism in adjusted positions, means for supporting the builder for oscillation about a fixed axis, a cam arm projecting from the builder, a rotatable main cam acting on said arm to oscillate the builder, and latch means for releasably holding the gear controlling means against remeshing the gears and acting to release the gear controlling means in timed relation to the rotation of said main cam.

14. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting oscillation of the chain segment, gear controlling means for unmeshing and remeshing said gears in timed relation to the last-mentioned means, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, and latch means for releasably holding the gear controlling means against remeshing the gears and acting to release the gear controlling means in timed relation to the rotation of said main cam.

15. In a builder mechanism for spinning machines, a supporting frame, a draft chain segment mounted on said frame for oscillatory motion, a driving shaft, a driven shaft, gears on said shafts one of which is movable to mesh with and unmesh from the other, a pick motion associated with the driven shaft to impart slow motion thereto, means actuated from the driven shaft and effecting a series of short oscillations of the chain segment followed by a single long oscillation thereof, gear controlling means acting to unmesh the gears upon completion of the series of short oscillations and to remesh the gears in timed relation to the completion of the long oscillation, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam.

16. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, a stop motion device controlling the driving-shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam.

17. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, including adjustable timing mechanism and means to hold the timing mechanism in adjusted positions, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam.

18. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting oscillation of the chain segment, gear controlling means for unmeshing and remeshing said gears in timed relation to the last-mentioned means, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, stop motion mechanism including an adjustable member controlling the timing relation with the main cam, and means for securing the adjustable member in adjusted position.

19. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting a series of short oscillations of the chain segment followed by a single long oscillation thereof, gear controlling means acting to unmesh the gears upon completion of the series of short oscillations and to remesh the gears in timed relation to the completion of the long oscillation, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, stop motion mechanism including an adjustable member controlling the timing relation with the main cam and means for securing the adjustable member in adjusted position.

20. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, stop motion mechanism including an adjustable member controlling the timing relation with the main cam and means for securing the adjustable member in adjusted position.

21. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, including adjustable timing mechanism, means to hold the timing mechanism in adjusted positions, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, stop motion mechanism including an adjustable member controlling the timing relation with the main cam and means for securing the adjustable member in adjusted position.

22. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, means actuated from the driven shaft and effecting oscillation of the chain segment, gear controlling means for unmeshing and remeshing said gears in timed relation to the last-mentioned means, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, said stop motion including an adjustable member controlling the timing relation with the main cam and means for securing the adjustable member in adjusted position.

23. In a builder mechanism for spinning machines, a supporting frame, a draft chain segment mounted on said frame for oscillatory motion, a driving shaft, a driven shaft, gears on said shafts one of which is movable to mesh with and unmesh from the other, a pick motion associated with the driven shaft to impart slow motion thereto, means actuated from the driven shaft and effecting a series of short oscillations of the chain segment followed by a single long oscillation thereof, gear controlling means acting to unmesh the gears upon completion of the series of short oscillations and to remesh the gears in timed relation to the completion of the long oscillation, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, said stop motion including an adjustable member controlling the timing relation with the main cam and means for securing the adjustable member in adjusted position.

24. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the driven shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, a stop motion device controlling the driving-shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, said stop motion including an adjustable member controlling the timing relation with the main cam and means for securing the adjustable member in adjusted position.

25. In a builder mechanism for spinning machines, a supporting frame, a draft chain segment mounted on said frame for oscillatory motion, a driving shaft, a driven shaft, gears on said shafts, one of which is movable to mesh with and unmesh from the other, a pick motion associated with the drive shaft to impart slow motion thereto, a sinuous cam driven from the driven shaft and acting to produce short oscillations of the chain segment, a single throw cam acting upon the chain segment upon completion of action of the sinuous cam, gear controlling means holding said gears in mesh during action of the sinuous cam and unmeshing the gears upon completion of action by the sinuous cam, including adjustable timing mechanism and means to hold the timing mechanism in adjusted positions, a stop motion device controlling the driving shaft, means operating in timed relation to the gear controlling means for effecting operation of the stop motion device, means for supporting the builder for oscillation about a fixed axis, a cam arm projecting from the builder, a rotatable main cam acting on said arm to oscillate the builder, latch means for releasably holding the gear controlling means against remeshing the gears and acting to release the gear controlling means in timed relation to the rotation of said main cam, said stop motion including an adjustable member controlling the timing relation with the main cam and means for securing the adjustable member in adjusted position.

26. A spinning frame builder having a ring rail reciprocating chain and including a builder supporting shaft, builder frame elements mounted on said shaft and oscillatable thereon, a driving shaft, main cam means driven from said driving-shaft and effecting oscillation of the builder elements on the supporting-shaft, a segment supported on one of the builder frame elements for oscillation relative thereto and having one end of the chain attached thereto, and means for effecting primary relatively short oscillations of the segment and thereafter effecting a single long oscillation of said segment.

27. In a builder mechanism for spinning machines, a supporting frame, a draft chain segment mounted on said frame for oscillatory motion, a driving-shaft, a driven-shaft, gears on said shafts, one of which is movable to mesh with and unmesh from the other, a pick motion associated with the driven shaft to impart slow motion thereto, a sinuous cam driven from the driven shaft, a single throw cam acting upon the chain segment upon completion of action of the sinuous cam, gear controlling means for holding said gears in mesh during action of the sinuous cam, and adjustable timing mechanism.

28. In a builder mechanism for spinning machines, a supporting frame, a draft chain segment mounted on said frame for oscillatory motion, a driving shaft, a driven shaft, gears on said shafts, one of which is movable to mesh with and unmesh from the other, means for controlling said gears, a pick motion associated with the driven shaft to impart slow motion thereto, said gear controlling mechanism including adjustable timing mechanism, means for holding the timing mechanism in adjusted positions, builder means, means for supporting the builder means for oscillation about a fixed axis, a cam-arm projecting from the builder means, a rotatable main cam acting on said arm to oscillate the builder means, and latch means for releasably holding the gear controlling means against re-meshing the gears and acting to release the gear controlling means in timed relation to the rotation of said main cam.

29. In a builder mechanism for spinning machines, a supporting frame, a driving shaft, a driven shaft, gears on said shafts, one of which is movable to mesh with and unmesh from the other, a pick motion associated with the driven shaft to impart slow motion thereto, gears controlling means for unmeshing and remeshing said gears in timed relation to the last-mentioned means, a stop motion device controlling the driving shaft, means operating in timed relation to the gear controlling means for effecting operation of the stop motion device, builder means, means for supporting the builder means for oscillation about a fixed axis, a cam-arm projecting from the builder means, a rotatable main cam acting on said arm to oscillate the builder means, and latch means for releasably holding the gear controlling means against the remeshing gears and acting to release the gear controlling means in timed relation to the rotation of said main cam.

GEORGE E. REPASS.